United States Patent [19]

Sorensen

[11] 4,391,099
[45] Jul. 5, 1983

[54] ATMOSPHERIC THERMAL ENERGY CONVERSION UTILIZING INFLATABLE PRESSURIZED RISING CONDUIT

[76] Inventor: Jens O. Sorensen, P. O. Box 2274, Rancho Santa Fe, Calif. 92067

[21] Appl. No.: 189,610

[22] Filed: Sep. 22, 1980

[51] Int. Cl.$^3$ ............................ F03G 7/02; F03G 7/04
[52] U.S. Cl. ................................ 60/641.6; 60/641.12; 60/641.14; 60/682; 60/721
[58] Field of Search ............... 60/641.1, 641.6, 641.11, 60/641.12, 641.14, 650, 682

[56] References Cited

U.S. PATENT DOCUMENTS

| | | | |
|---|---|---|---|
| 3,436,908 | 4/1969 | Van Delic | 60/641.12 |
| 3,894,393 | 7/1975 | Carlson | 60/641.12 |
| 3,936,652 | 2/1976 | Levine | 290/2 |
| 4,096,698 | 6/1978 | Martin | 60/682 |
| 4,106,295 | 8/1978 | Wood | 60/649 |
| 4,143,516 | 3/1979 | Long | 60/649 |
| 4,157,014 | 6/1979 | Clark, Jr. | 60/682 |
| 4,182,124 | 1/1980 | Kraus et al. | 60/398 |

*Primary Examiner*—Allen M. Ostrager

[57] ABSTRACT

A system and method of atmospheric thermal energy conversion is disclosed utilizing pressurized inflatable rising conduit. The method includes the steps of: (a) providing warm or cold gas at a predetermined elevation; (b) transporting the gas vertically from the predetermined elevation to a different elevation through a thin-walled, inflatable, rising conduit, thereby providing gas within the conduit with a density which causes the gas to flow through the conduit; (c) converting the energy of the flowing gas by passing the gas through a transducer; (d) pressurizing the conduit from the inside with the transported gas to thereby inflate and support the thin-walled, inflatable, rising conduit.

32 Claims, 5 Drawing Figures

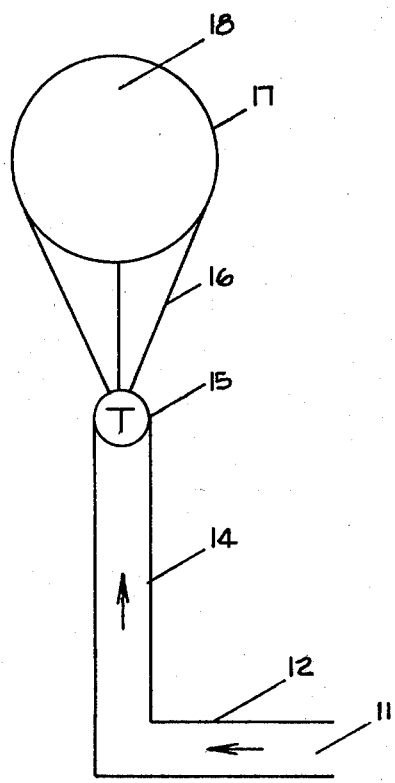
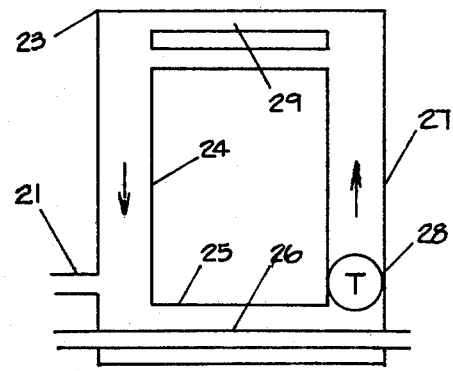
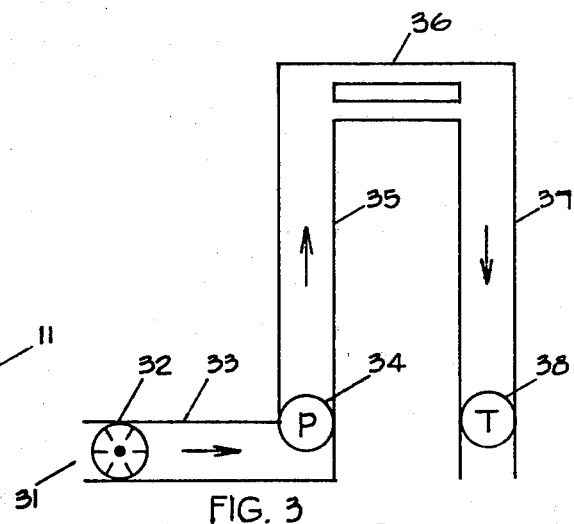
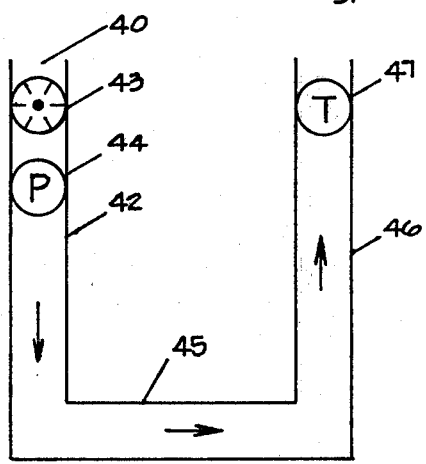
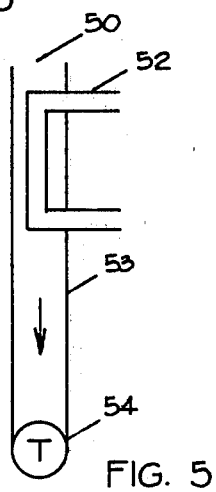

4,391,099

ATMOSPHERIC THERMAL ENERGY CONVERSION UTILIZING INFLATABLE PRESSURIZED RISING CONDUIT

FIELD OF THE INVENTION

The invention generally pertains to atmospheric thermal energy conversion and is particularly directed to systems utilizing a rising conduit to enclose a vertical flow of air, and a transducer such as a turbine generator to convert the energy of the flowing air into a useful type of energy.

DISCUSSION OF PRIOR ART

Examples of prior art in the same field of invention are described in U.S. Pat. No. 3,436,908 to V. Van Delic for Solar Air Moving System; U.S. Pat. No. 3,936,652 to Levine for Power System; U.S. Pat. No. 4,096,698 to Martin for Solar Energy Converting Device; U.S. Pat. No. 4,106,295 to Wood for Air Pressure Differential Energy System; and U.S. Pat. No. 4,143,516 to Long for Air-Water Power Generator.

Heretofore, atmospheric thermal energy conversion systems have been proposed, but to my knowledge never constructed because in order to get a sufficient efficiency from the conversion system the rising conduit must be of very large height and cross sectional area. The material needed for such gigantic structure have been so large that the cost thereof has been prohibitive because of the resulting low cost-efficiency of the previously proposed conversion systems.

OBJECTS OF THE INVENTION

It is the object of this invention to disclose a system and method of atmospheric thermal energy conversion which makes it possible to use only a small amount of materials for the structure of the rising conduit in order to arrive at a feasible cost-efficiency of the conversion system. Another object of the invention is to construct a means of holding up and supporting the structure of the rising conduit when only the small amount of material for the structure is used. Further objects of the invention will become apparent from a consideration of the drawings and the description of the drawings.

SUMMARY OF THE INVENTION

The present invention discloses a system and method of atmospheric thermal energy conversion utilizing pressurized inflatable rising conduit. The method includes the steps of: (a) providing warm or cold gas at a predetermined elevation; (b) transporting the gas vertically from the predetermined elevation to a different elevation through a thin-walled, inflatable, rising conduit thereby providing gas within the conduit with a density which causes the gas to flow through the conduit; (c) converting the energy of the flowing gas by passing the gas through a transducer; (d) pressurizing the conduit from the inside with the transported gas to thereby inflate and support the thin-walled, inflatable, rising conduit. The method may also include the further step of: (e) holding up and supporting the conduit by connecting thereto enclosed pocket/s of low density gas.

And the further step of: dissolving a liquid in the gas to retard the adiabatic change in temperature to provide a desirable density and resultant pressure of the gas.

BRIEF DESCRIPTION OF THE DRAWING

FIGS. 1 to 5 are schematic diagrams of five alternative preferred embodiments of Atmospheric Thermal Energy Conversion Systems utilizing pressurized rising conduit according to the present invention.

The upward direction of the drawing sheet is the high elevation direction of the illustrated embodiments.

DESCRIPTION OF THE PREFERRED EMBODIMENTS

The system illustrated in FIG. 1 includes:

A solar heating chamber 12 positioned on the floor of a desert, with an opening 11 in the solar heating chamber 12.

A thin-walled, inflatable, rising conduit 14 with its upper end at a high elevation and its lower end at a low elevation connected at the low elevation to the solar heating chamber 12.

A turbine generator 15 connected to the rising conduit 14 at the high elevation.

A balloon 17 connected by connecting cables 16 to the rising conduit 14 and the turbine 15 at the high elevation.

The operation of the system illustrated in FIG. 1 is as follows:

A gas of ambient air is provided at the opening 11. The air flows through the solar heating chamber 12 where the air is heated by solar energy to provide warm air at the low elevation. The warm air is then transported upwards from the low elevation to the high elevation through the thin-walled, inflatable, rising conduit 14, thereby providing air within the conduit 14 with a low density which causes the flow of air through the conduit 14 and the chamber 12 to the turbine 15 at the high elevation where the air flows through the turbine generator 15 and the energy of the flowing air is converted into electricity. The thin-walled, inflatable, rising conduit 14 is pressurized from the inside because the air in the rising conduit 14 has a density which is lower than the density of the ambient air at the same elevation, the low density air causes a high pressure in the conduit 14 in relation to ambient pressure outside the conduit 14 to thereby inflate and support the thin-walled, inflatable, rising conduit 14.

A balloon 17 enclosing low density gas 18 such as hydrogen, is used to hold up and support the rising conduit 14 and the turbine 15 utilizing connecting cables 16 at the high elevation.

The position and elevation of the turbine 15 will change as the thin-walled, inflatable, rising conduit 14 and the balloon 17 is moved about with the wind.

The system illustrated in FIG. 2 includes:

A first thin-walled, inflatable, rising conduit 24 with its upper end at a high elevation and its lower end at a low elevation.

A heating chamber 25 positioned on the floor of a desert, connected at the low elevation to the first rising conduit 24.

A heat exchanger 26 positioned in the heating chamber 25.

A second thin-walled, inflatable, rising conduit 27 connected at the low elevation to the heating chamber 25.

A turbine generator 28 positioned in the second rising conduit 27.

A cooling chamber 29 connected at the high elevation to the second rising conduit 27 and the first rising conduit 24. A provider conduit 21 connected to the first rising conduit 24.

The operation of the system illustrated in FIG. 2 is as follows:

Hydrogen gas is provided in the first thin-walled, rising conduit 24. The gas flows through the heating chamber 25 and the gas is heated by the heat exchanger 26 to provide warm gas at the low elevation. The warm gas is then transported upwards from the low elevation to the high elevation through the thin-walled inflatable, rising conduit 27, thereby providing warm gas within the conduit 27 with a low density which causes the upward flow of the gas through the rising conduit 27. The energy of the flowing gas is converted into electricity in the turbine generator 28 positioned in the rising conduit 27. The gas then flows into the cooling chamber 29 where the gas is cooled by heat transfer to the atmospheric air by convection, conduction and radiation to provide cold gas at the high elevation in the first thin-walled, inflatable, rising conduit 24. The cold gas then flows downwards from the high elevation to the low elevation, through the thin-walled, inflatable rising conduit 24, thereby providing cold gas within the rising conduit 24, with a density which is lower than that of the warm gas in rising conduit 27, thereby causing the downward flow of the gas through the rising conduit 24.

The gas which flows in the first rising conduit is said hydrogen gas which is provided in the first rising conduit 24. Because the hydrogen gas in the first and second rising conduits, 24 and 27, has a density which is lower than the density of the ambient air, the low density gas causes a high pressure in the cooling chamber 29 and the first and second thin-walled, inflatable, rising conduits 27 and 24 in relation to ambient pressure outside the rising conduits 27 and 24 at the same elevation, thereby pressurizing the cooling chamber 29 and the rising conduits 27 and 24. The whole conduit and chamber system 23 is further pressurized by providing high pressure hydrogen gas in provider conduit 21.

The conduit and chamber system 23 is held up and supported by the enclosed low density hydrogen gas within the system 23, which is intimately connected to the conduits 24 and 27.

The system illustrated in FIG. 3 includes:

A solar heating chamber 33 positioned at the base of a mountain, with an opening 31 of the solar heating chamber 33 and with a humidifier nozzle system 32 in the opening 31 of the heating chamber 33.

A first thin-walled, inflatable, rising conduit 35, attached to the mountainside and extending from a low elevation to a high elevation, connected at the low elevation to the solar heating chamber 33.

A compression pump 34 located at the low elevation within the rising conduit 35.

A cooling chamber 36 located high on the mountain at the high elevation connected to the rising conduit 35.

A second thin-walled, inflatable, rising conduit 37 attached to the mountainside and extending from the low elevation to the high elevation connected at the high elevation to the cooling chamber 36.

A turbine generator 38 positioned at the low elevation within the second thin-walled inflatable rising conduit 37.

The operation of the system illustrated in FIG. 3 is as follows:

A gas of ambient air is provided at the opening 31 of the solar heating chamber 33. The air flows past the humidifier nozzle system 32 wherein a liquid of water is provided. A fine mist of water from the humidifier is mixed with the air and the resulting mixture flows into the solar heating chamber 33 where the mixture is heated by solar energy, causing the mist of water to dissolve in the heated air. The resulting warm, humid air then flows through the compression pump 34 which compresses the air. The warm, humid air is then transported upwards from the low elevation to the high elevation through the thin-walled, inflatable, rising conduit 35 where the dissolved water in the air retards the adiabatic cooling by liquid condensing in the air as the air rises upwards in the conduit 35, thereby providing air with a low density in the conduit 35 which causes the upward flow of the warm air through the rising conduit 35. The air then flows into the cooling chamber 36 where the air is cooled by heat transfer to the atmospheric air by convection, conduction and radiation, thereby providing cold air at the high elevation in the second thin-walled, inflatable, rising conduit 37. As the moist air flows upwards and as it is cooled in the cooling chamber 36, some water condenses in the air to become a mist, thereby introducing water as particles in the cold air. The mist-containing cold air then flows downwards from the high elevation to the low elevation through the second thin-walled, inflatable rising conduit 37 where the water particles in the air retard the adiabatic heating by water particles dissolving in the air as the air flows downwards in the conduit 37, thereby providing air with a high density which is higher than the density of warm air flowing upwards in the conduit 35 which causes the downward flow of the cold air through the rising conduit 37. The air then flows through the turbine generator 38 where the energy of the flowing air is converted into electricity. The first and second thin-walled, inflatable, rising conduits 35 and 37 and the cooling chamber 36, are pressurized from the inside with the transported air by the compression pump 34, and further compressed because the upflowing air in the first rising conduit 35 has a density which is lower than the density of the ambient air and because the downflowing air in the second rising conduit 37 has a density which is higher than the density of the ambient air thereby pressurizing the thin-walled, inflatable, rising conduits 35 and 37, and the cooling chamber 36 from the inside with the transported air to thereby inflate and support the thin-walled, inflatable rising conduits 35 and 37.

The system illustrated in FIG. 4 includes:

A first thin-walled, inflatable, rising conduit 42, attached to the side of a mountain with its upper end at a high elevation high on the mountain and its lower end at a low elevation at the foot of the mountain with an opening 40 at the high elevation in the conduit 42 and with a humidifier nozzle system 43 in the opening 40 of the conduit 42.

A compression pump 44 at the high elevation in conduit 42.

A solar heating chamber 45 connected at the low elevation to the conduit 42.

A second thin-walled, inflatable, rising conduit 46 extending from the low elevation to the high elevation and connected at the low elevation to the solar heating chamber 45.

A turbine generator 47 positioned at the high elevation within the rising conduit 46.

The operation of the system illustrated in FIG. 4 is as follows:

A gas of ambient air is provided at the opening 40. The air flows past the humidifier nozzle system 43 wherein a liquid of water is provided. A fine mist of water particles from the humidifier 43 is mixed with the air whereby some of the water evaporates and dissolves in the air, thereby cooling the air, some of the water particles remaining as a mist in the air. The resulting mixture flows through the compression pump 44 compressing the mixture. The cold mixture is then transported downwards from the high elevation to the low elevation through the thin-walled, inflatable, rising conduit 42 where the fine mist of water particles in the air retards the adiabatic heating by the action of the particles dissolving in the air as the air flows downwards within the conduit 42, thereby providing air with a high density in the conduit 42 which causes the downward flow of cold air through the rising conduit 42.

The air then flows into the solar heating chamber 45, the air still contains some of the fine mist of water particles which evaporate and dissolve in the air as the air is heated by solar energy, thereby providing warm, humid air at the low elevation in the second thin-walled, inflatable, rising conduit 46. The warm humid air then flows upwards from the low elevation to the high elevation through the second conduit 46 whereby the adiabatic cooling is retarded by water particles condensing in the air as the air rises upwards within the conduit 46, thereby providing air with a low density which is lower than the density of the cold air flowing downwards in the conduit 42, thereby causing the upwards flow of the warm air through the rising conduit 46. The air then flows through the turbine generator 47 where the energy of the flowing air is converted into electricity. The first and second thin-walled, inflatable, rising conduits 42 and 46 and the solar heating chamber 45, are pressurized from the inside with the transported air by the compression pump 44, and further compressed because the downflowing air in the first rising conduit 42 has a density which is higher than the density of the ambient air and because the upflowing air in the second rising conduit 46 has a density which is lower than the density of the ambient air, thereby pressurizing the thin-walled, inflatable, rising conduits 42 and 46 and the solar heating chamber 45 from the inside with the transported air to thereby inflate and support the thin-walled, inflatable, rising conduits 42 and 46.

The system illustrated in FIG. 5 includes:

A thin-walled, inflatable, rising conduit 53 attached to the side of a mountain with an opening 50 of the conduit 53 at its upper end at a high elevation and with its lower end at a low elevation.

A heat exchanger 52 positioned at the high elevation within the rising conduit 53.

A turbine generator 54 positioned at the low elevation within the rising conduit 53.

The operation of the system illustrated in FIG. 5 is as follows:

A gas of ambient air is provided at the opening 50 at the high elevation of the thin-walled, inflatable, rising conduit 53. The air flows past the heat exchanger 52 where the air is cooled to provide cold air at the high elevation. The cold air is then transported downwards from the high elevation to the low elevation through the thin-walled, inflatable, rising conduit 53, thereby providing cold air within the conduit 53 with a high density thereby causing the downward flow of air through the conduit 53 to the turbine generator 54 at the low elevation where the air flows through the turbine generator 54, causing the energy of the flowing air to be converted into electricity. The thin-walled, inflatable, rising conduit 53 is pressurized from the inside because the air in the rising conduit 53 has a density which is higher than the density of the ambient air at the same elevation, the high density air causes a high pressure in the conduit 53 in relation to ambient pressure outside the conduit 53 to thereby inflate and support the thin-walled, inflatable, rising conduit 53.

While the above descriptions contain many specificities, these should not be construed as limitations on the scope of the invention, but rather as an exemplification of the preferred embodiments thereof. Many other variations are possible, for example systems where the hot air in the rising conduit is used to lift up the rising conduit. Accordingly, the scope of the invention should be determined not by the embodiments illustrated, but by the appended claims and their legal equivalents.

I claim:

1. A method of atmospheric thermal energy conversion utilizing pressurized rising conduit comprising the steps of:
   (a) providing warm gas at a low elevation,
   (b) transporting the warm gas upwards from the low elevation to a high elevation through a thin-walled, inflatable, rising conduit thereby providing gas within the conduit with a low density which causes the upward flow of the gas through the conduit,
   (c) converting the energy of the flowing gas by passing the gas through a transducer,
   (d) pressurizing the conduit from the inside with the transported gas to thereby inflate and support the thin-walled, inflatable rising conduit.

2. A method according to claim 1 wherein step (a) comprises:
   (e) providing gas at the low elevation,
   (f) heating the gas at an elevation which is lower than the high elevation to thereby provide the warm gas at the low elevation.

3. A method according to claim 2 further comprising the steps of:
   (g) providing a liquid,
   (h) dissolving the liquid in the gas to provide a humid gas at an elevation which is lower than the higher elevation to retard adiabatic cooling by liquid condensing in the gas as the gas rises upwards within the conduit, thereby decreasing the density of the gas within the conduit.

4. A method according to claim 2 wherein step (f) comprises:
   (g) heating the gas by solar energy.

5. A method according to claim 1 wherein step (d) comprises:
   (e) providing a gas in the rising conduit with a density which is lower than the density of the ambient air whereby the low density gas causes a high pressure in the conduit in relation to the ambient pressure outside the conduit at the same elevation, thereby pressurizing the conduit.

6. A method according to claim 5 wherein step (d) comprises:
   (f) pressurizing the conduit by pumping said gas into the conduit at the low elevation.

7. A method of atmospheric thermal energy conversion utilizing pressurized rising conduit comprising the steps of:
   (a) providing cold gas at a high elevation, (b) transporting the cold gas downwards from the high elevation to a low elevation through a thin-walled, inflatable, rising conduit thereby providing gas within the conduit with a high density which causes the downward flow of the gas through the conduit, (c) converting the energy of the flowing gas by passing the gas through a transducer, (d) pressurizing the conduit from the inside with the transported gas to thereby inflate and support the thin-walled, inflatable, rising conduit.

8. A method according to claim 7 wherein step (a) comprises:

(e) providing gas at the high elevation, (f) cooling the gas at an elevation which is higher than the low elevation.

9. A method according to claim 7 further comprising the step of:

(g) providing a liquid, (h) introducing the liquid as particles into the gas to provide humid cold gas at an elevation which is higher than the lower elevation to retard the adabatic heating by the action of the liquid particles dissolving into the gas as the gas sinks downwards within the conduit, thereby increasing the density of the gas within the conduit.

10. A method according to claim 8 wherein step (f) comprises:

(g) providing a liquid, (h) cooling the gas by combining the liquid with the gas.

11. A method according to claim 7 wherein step (d) comprises:

(e) providing a gas in the rising conduit with a density which is higher than the density of the ambient air, whereby the high density gas causes a high pressure in the conduit in relation to the ambient pressure outside the conduit at the same elevation, thereby pressurizing the conduit.

12. A method according to claim 11 wherein step (d) comprises:

(f) pressurizing the conduit by pumping said gas into the conduit at the high elevation.

13. A method according to claims 1 or 7 further comprising the step of:

(e) holding up and supporting the conduit by connecting thereto enclosed pockets of low density gas.

14. A method according to claims 1 or 7 further comprising the step of:

(e) pressurizing the conduit by providing pressurized gas in the conduit.

15. A method according to claims 1 or 7 wherein step (a) comprises the step of:

(e) providing air as the gas.

16. A method according to claims 3, 9, or 10 wherein step (g) comprises the step of:

(i) providing water as the liquid.

17. A system for atmospheric thermal energy conversion utilizing pressurized rising conduit comprising:

(a) means for providing warm gas at a low elevation, (b) a thin-walled, inflatable, rising conduit for transporting the warm gas upwards from the low elevation to a high elevation, thereby providing gas within the conduit with a low density which causes the upward flow of the gas through the conduit, (c) a transducer for converting the energy of the flowing gas, (d) means for pressurizing the conduit from the inside with the transported gas to thereby inflate and support the thin-walled, inflatable, rising conduit.

18. A system according to claim 17 wherein the providing means comprises:

(e) means for providing gas at the low elevation, (f) means for heating the gas at an elevation which is lower than the high elevation to provide the warm gas at the low elevation.

19. A system according to claim 18 further comprising:

(g) means for providing a liquid, (h) means for dissolving the liquid in the gas to provide a humid gas at an elevation which is lower than the higher elevation to retard adiabatic cooling by liquid condensing in the gas as the gas rises upwards within the conduit thereby decreasing the density of the gas within the conduit.

20. A system according to claim 18 wherein the heating means comprises:

(g) means for heating the gas by solar energy.

21. A system according to claim 17 wherein the pressurizing means comprises:

(e) a transducer for converting the energy at the high elevation whereby the low density gas causes a high pressure in the conduit in relation to the ambient pressure outside the conduit at the same elevation, thereby pressurizing the conduit.

22. A system according to claim 21 wherein the pressurizing means comprises:

(f) means for pressurizing the conduit by pumping said provided gas into the conduit at the low elevation.

23. A system for atmospheric thermal energy conversion utilizing pressurized rising conduit comprising:

(a) means for providing cold gas at a high elevation, (b) a thin-walled, inflatable, rising conduit for transporting the cold gas downwards from the high elevation to a low elevation, thereby providing gas within the conduit with a high density which causes the downward flow of the gas through the conduit, (c) a transducer for converting the energy of the flowing gas, (d) means for pressurizing the conduit from the inside with the transported gas to thereby inflate and support the thin-walled, inflatable, rising conduit.

24. A system according to claim 23 wherein the providing means comprises:

(e) means for providing gas at the high elevation, (f) means for cooling the gas at an elevation which is higher than the low elevation to thereby provide the cold gas at the high elevation.

25. A system according to claim 23 further comprising:

(g) means for providing a gas, (h) means for introducing the liquid as particles into the gas to provide humid cold gas at an elevation which is higher than the lower elevation to retard the adabatic heating by the action of the liquid particles dissolving into the gas as the air sinks downwards within the conduit thereby increasing the density of the gas within the conduit.

26. A system according to claim 24 wherein the cooling means comprises:

(g) means for providing a liquid, (h) means for cooling the gas by combining the liquid with the gas.

27. A system according to claim 23 wherein the pressurizing means comprises:
  (e) means for converting the energy at the low elevation whereby the high density gas causes a high pressure in the conduit in relation to the ambient pressure outside the conduit at the same elevation, thereby pressurizing the conduit.

28. A system according to claim 27 wherein pressurizing means comprises:
  (f) means for pressurizing the conduit by pumping said provided gas into the conduit at the high elevation.

29. A system according to claims 17 or 23 further comprising:
  (e) enclosed pockets of low density gas connected to the conduit to lift up and support the conduit.

30. A system according to claims 17 or 23 further comprising:
  (e) means for pressurizing the conduit by providing pressurized gas in the conduit.

31. A system according to claims 17 or 23 further comprising:
  (e) means for providing air as the gas.

32. A system according to claims 19, 25 or 26 further comprising:
  (i) means for providing water as the liquid.

* * * * *